(12) United States Patent
Mahimkar et al.

(10) Patent No.: US 9,173,106 B2
(45) Date of Patent: Oct. 27, 2015

(54) EFFICIENT CELL SITE OUTAGE MITIGATION

(71) Applicant: AT&T Intellectual Property I, L.P., Atlanta, GA (US)

(72) Inventors: Ajay Mahimkar, Woodbridge, NJ (US); Ioannis Broustis, Millburn, NJ (US); Zihui Ge, Madison, NJ (US); Sarat Puthenpura, Berkeley Heights, NJ (US); Leonid Razoumov, Riverdale, NY (US); Aman M. Shaikh, Berkeley Heights, NJ (US); Nemmara K. Shankaranarayanan, Bridgewater, NJ (US); Jia Wang, Randolph, NJ (US); Xing Xu, Los Angeles, CA (US); He Yan, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 152 days.

(21) Appl. No.: 14/088,684

(22) Filed: Nov. 25, 2013

(65) Prior Publication Data
US 2015/0146514 A1 May 28, 2015

(51) Int. Cl.
*G06F 11/00* (2006.01)
*H04L 12/28* (2006.01)
(Continued)

(52) U.S. Cl.
CPC .................... *H04W 16/22* (2013.01)

(58) Field of Classification Search
CPC ..... H04W 16/18; H04W 16/22; H04W 24/02; H04W 24/04; H04W 24/08; H04W 28/02; H04W 28/0205; H04W 28/18; H04W 36/08; H04W 36/22; H04W 36/30; H04W 40/04; H04W 52/0203; H04W 72/00; H04W 76/025; H04W 76/028; H04W 84/18; G06N 3/04; G06N 3/0436; G06N 3/086; G06N 99/005; G05B 13/02; G05B 13/0265; G05B 19/4083; Y04S 40/162; H04L 41/0803; H04L 41/0816; H04L 41/0823; H04L 41/0866; H04L 41/0886; H04L 41/20; H04L 63/1408
USPC .................. 370/216–240, 241–258, 400–401, 370/431–437, 449–462, 464–465; 455/418–420, 431–466; 709/220–229
See application file for complete search history.

(56) References Cited

U.S. PATENT DOCUMENTS 7,768,968 B2   8/2010   Plehn et al.
8,219,057 B2   7/2012   Kenington et al.
(Continued)

OTHER PUBLICATIONS

Amirijoo, et al. "Cell Outage Management in LTE Networks." 6th International Symposium on Wireless Communication Systems, Tuscany, Italy, Sep. 7-10, 2009, pp. 600-604.
(Continued)

*Primary Examiner* — Tri H Phan
(74) *Attorney, Agent, or Firm* — Amin, Turocy & Watson, LLP

(57) ABSTRACT

To efficiently mitigate cell coverage disruptions caused by either unplanned equipment failures or planned outages during maintenance activities, an efficient cell site outage mitigation system is provided to calculate an optimal configuration for neighboring cell site devices before adjusting the cell site configuration settings to cover the coverage gap. The optimal configuration is determined using an offline model learner. Radio frequency propagation models and user demand and distribution models can be used to determine the offline solution. The optimal configuration setting learnt using an offline model is then implemented when an outage is determined to have occurred in the operational field.

20 Claims, 9 Drawing Sheets

(51) Int. Cl.
*H04M 3/00* (2006.01)
*G06F 15/177* (2006.01)
*H04W 16/22* (2009.01)

(56) References Cited

U.S. PATENT DOCUMENTS

| | | |
|---|---|---|
| 8,509,762 B2 | 8/2013 | Li et al. |
| 2011/0096687 A1* | 4/2011 | Dottling et al. ............... 370/252 |
| 2012/0307697 A1 | 12/2012 | Mukhopadhyay |
| 2012/0329471 A1 | 12/2012 | Barta et al. |
| 2013/0005385 A1 | 1/2013 | Hunukumbure et al. |
| 2013/0115959 A1 | 5/2013 | Amirijoo et al. |
| 2013/0122885 A1 | 5/2013 | Kojima |
| 2013/0201916 A1 | 8/2013 | Kummetz et al. |
| 2013/0242720 A1 | 9/2013 | Chou |
| 2013/0242736 A1 | 9/2013 | Tarraf et al. |
| 2013/0244644 A1 | 9/2013 | Amirijoo et al. |
| 2013/0272132 A1* | 10/2013 | Heo et al. .................... 370/236.2 |
| 2013/0331079 A1* | 12/2013 | Racz et al. ..................... 455/418 |
| 2014/0068034 A1 | 3/2014 | Tapia ............................ 709/221 |
| 2014/0376374 A1* | 12/2014 | Moser et al. ................... 370/235 |
| 2015/0023209 A1* | 1/2015 | Gunnarsson et al. ......... 370/254 |
| 2015/0050925 A1* | 2/2015 | Tapia ............................ 455/418 |
| 2015/0098393 A1* | 4/2015 | Tofighbakhsh et al. ....... 370/329 |

OTHER PUBLICATIONS

"Self-Optimizing Networks: The Benefits of SON in LTE." 4G Americas, Jul. 2011, 69 pages.

* cited by examiner

EFFICIENT CELL SITE OUTAGE MITIGATION

TECHNICAL FIELD

The subject disclosure relates to mitigating a cell site outage, and, more specifically, to determining an optimal configuration setting for a cell site device before an outage occurs.

BACKGROUND

Cell tower outages can occur in operation networks either due to unplanned equipment failures or planned maintenance activities. Traditionally, the resolution strategy is to repair the network equipment and get the service up and running. Meanwhile, the end-users can communicate using neighboring cell towers that are up. Depending on the radio coverage and network capacity, some users either might be denied service due to coverage holes or might experience a degraded quality of service due to overload conditions.

DETAILED DESCRIPTION

Figure 1:
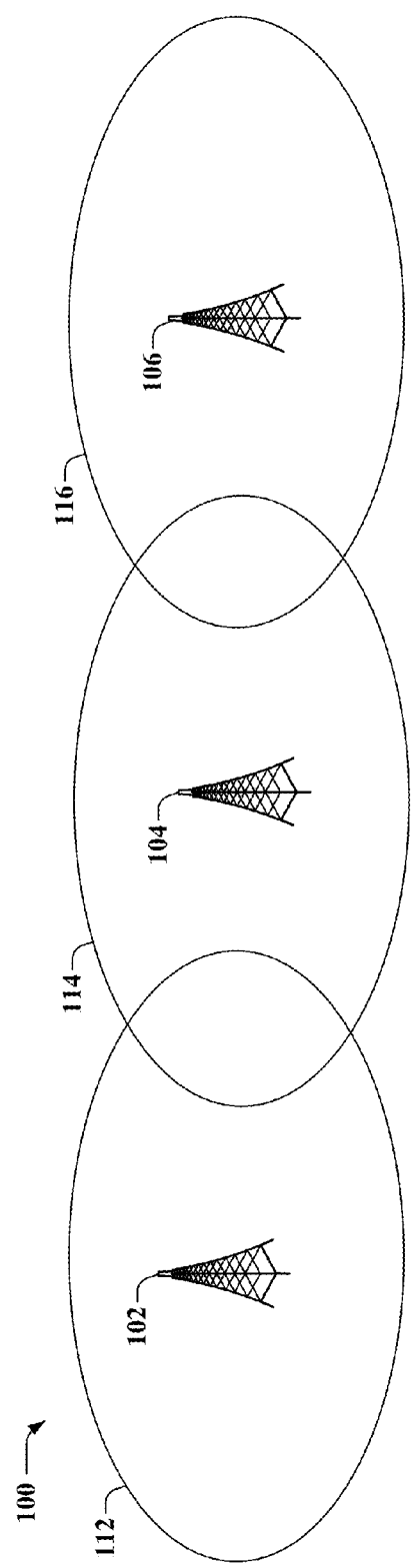
FIG. 1 is an example, non-limiting embodiment of an efficient cell site outage mitigation system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To efficiently mitigate cell coverage disruptions caused by either unplanned equipment failures or planned outages during maintenance activities, an efficient cell site outage mitigation system is provided to calculate an optimal configuration for neighboring cell site devices before adjusting the cell site configuration settings to cover the coverage gap. The optimal configuration is determined using an offline model learner. Radio frequency propagation models and user demand and distribution models can be used to determine the offline solution. The optimal configuration setting learnt using an offline model is then implemented when an outage is determined to have occurred in the operational field. Incremental adjustments to the configuration settings can then be performed in a real-time fashion based on performance feedback from the field. This helps dynamically converge to the optimal solution.

Traditionally, incremental adjustments to antenna tilt and transmission power are performed from the initial, pre-outage, configuration setting to mitigate cell site outages. By determining an offline optimal solution beforehand however, faster convergence on a real world optimal solution can be obtained. Occasionally, incrementally adjusting antenna tilt and transmission power settings from the base configuration can cause the self-organizing networks to converge on local optimal solutions while avoiding or otherwise not arriving at global optimal solutions. Calculating a model optimal solution beforehand can avoid converging on these local solutions.

For these considerations as well as other considerations, in one or more embodiments, a system includes a memory to store executable instructions and a processor, coupled to the memory, to facilitate execution of the executable instructions to perform operations including determining a first simulated configuration setting for a first cell site device based on a simulated disablement of a second cell site device, wherein the first simulated configuration setting enables a simulated coverage model for an area associated with the first cell site device and the second cell site device. The operations also include adjusting a configuration setting for the first cell site device to match the first simulated configuration setting in response to determining that the second cell site is disabled. The operations also include incrementally adjusting the configuration setting according to a function that increases coverage for the area.

In another embodiment, a method includes determining, by a device comprising a processor, a model configuration setting for a first base station device based on information relating to a disabled neighboring base station device, wherein the model configuration setting provides a coverage model for an area associated with the first base station device and the disabled neighboring base station device. The method also includes adjusting a configuration setting for the first base station device to match the model configuration setting in response to determining that the neighboring base station device is offline.

In another embodiment, a computer readable storage device storing executable instructions, that in response to execution, cause a system comprising a processor to perform operations. That operations can include modeling a simulated configuration setting for a first base station device based on an offline second base station device that neighbors the first base station device, wherein the simulated configuration setting enables a coverage model for an area associated with the first base station device and the offline second base station device. The operations can further include adjusting a configuration setting for the first base station device to match the simulated configuration setting in response to determining that the second base station device is offline. The operations also include, incrementally adjusting the configuration setting to improve coverage for the area.

Turning now to FIG. 1, illustrated is an example, non-limiting embodiment of an efficient cell site outage mitigation system 100 in accordance with various aspects described herein. System 100 can include base station devices or cell site devices 102, 104, and 106 with corresponding coverage areas 112, 114, and 116 respectively. Under normal operation, coverage areas 112, 114, and 116 can overlap, providing sufficient quality of service to mobile devices in the coverage areas. As mobile devices move from one coverage area to the next, they can be handed over from one cell site device to the next due to the overlapping coverage areas.

It is to be appreciated that the system 100 shown in FIG. 1 has been simplified for ease of understanding. In the real world, many more than three cell site devices and coverage areas are possible and may be arranged in a non-linear manner.

It is also to be appreciated the term "cell site device" as used with reference to cell site devices 102, 104, and 106 refers to the base transceiver station or the set of equipment that facilitates wireless communications between user equipment and the network. For instance, the cell site device can include a power source/supply, modem/router to receive communications from the network, digital signal processors, transceivers, combiners/duplexers, antennas, and etc. The cell coverage area refers to the area within which a mobile device or user equipment can send and receive communications to and from the mobile network via the cell site device. The cell coverage area sizes and shapes can vary depending on power output of the cell site device, antenna tilt configuration, the local terrain/topology, interference from other radio sources, weather, and etc. The cell coverage areas in FIG. 1 are shown as ovals, but it should be appreciated that this convention is for simplicity and that in other embodiments, other configurations are possible.

If an outage, either planned due to maintenance or unplanned due to equipment failure, occurs to any of cell site devices 102, 104, or 106, mobile devices within the affected cell coverage area 112, 114, or 116 will suffer a loss of connectivity/signal unless they are in the small portion of the cell coverage area that overlaps with the cell coverage area of the neighboring cell site device. For example, if cell site device 102 goes offline, any mobile devices or user equipment in cell coverage area 112 will lose connectivity with the mobile network unless they are in the portion of cell coverage area 112 that overlaps with cell coverage area 114. Mobile devices in the overlapping section can be handed over to cell site device 104, but other mobile devices in cell coverage area 112 will lose their connection. Similarly, if cell site device 104 suffers an outage, mobile devices in cell coverage area 114 will lose connectivity unless they are in the areas that overlap with cell coverage areas 112 and 116.

Traditionally, when the outage occurs, the neighboring cell site devices will begin to incrementally adjust their configuration settings to mitigate the outage. If cell site device 104 goes offline, cell site devices 102 and 106 will adjust their settings incrementally so that cell coverage areas 112 and 116 cover as much of former cell coverage area 114 as possible. The iterations are performed slowly and incrementally, as the dynamics of adjusting tilt configurations with power settings requires small adjustments and then determining the best adjustment to make based on the outcome of the previous adjustment.

In an embodiment, a theoretical optimal configuration setting can be determined before the outage occurs and then once the outage is detected, the configuration setting can be adjusted to match the theoretical optimal configuration setting. An optimal configuration setting can be determined for all neighboring cell site devices of the cell site device suffering an outage. Therefore, in an example, if cell site device 104 were to go offline, a model optimal solution can be determined for both cell site devices 102 and 106. If cell site device 102 were to go offline, model solutions can be determined for both cell site devices 104 and 106.

Even though cell site device 106 does not directly neighbor cell site device 102, as cell site 104's cell coverage area 114 will be changed to cover former cell coverage area 112, cell coverage area 116 will have to adjust based on the changes to cell coverage area 114. Similarly, any cell site device that neighbors cell site device 106 may subsequently change as well. The system therefore calculates model optimal solutions for all neighbors ($1^{st}$ order, $2^{nd}$ order, $3^{rd}$ order, and etc) of any cell site device that may go offline.

In an embodiment, the simulated configuration setting can be determined before any outage occurs, based on planned outages, or in response to an outage occurring. In some embodiments, the simulated configuration setting can be determined after the outage happens, and the time taken to calculate can still be faster than incrementally adjusting the existing cell site devices.

Figure 2:
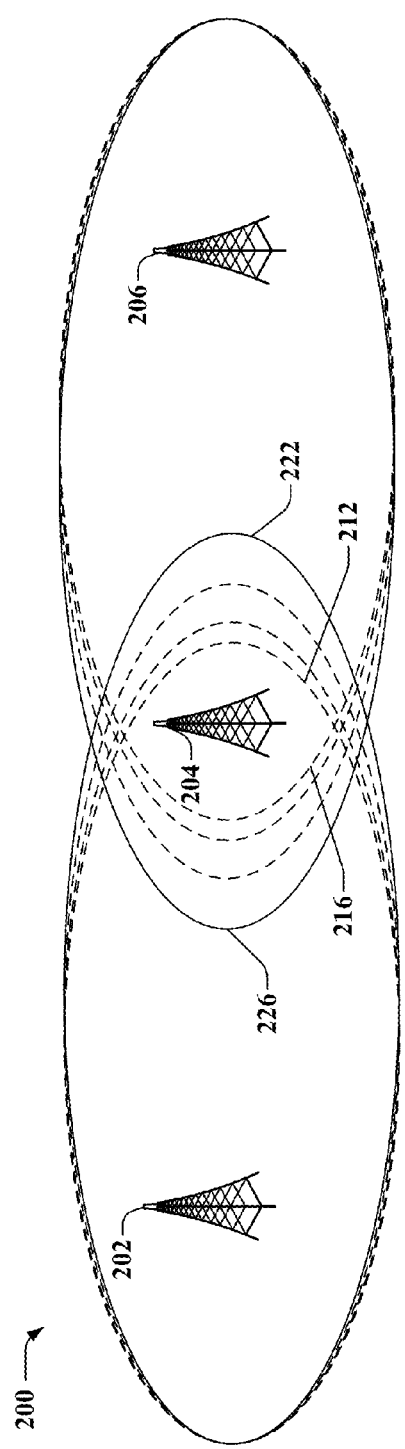
FIG. 2 is an example, non-limiting embodiment of an efficient cell site outage mitigation system in accordance with various aspects described herein.

Turning now to FIG. 2, illustrated is an example, non-limiting embodiment of an efficient cell site outage mitigation system 200 in accordance with various aspects described herein. Shown in FIG. 2 is an embodiment where cell site device 204 has gone offline, due to either a planned or unplanned outage. Model optimal configuration settings for cell site devices 202 and 206 can be determined either before the outage, or shortly after the outage is detected, and cell coverage areas 212 and 216 reflect the coverage of cell site devices 202 and 206 respectively after the configuration settings of cell site devices 202 and 206 are adjusted to match the model optimal configuration settings.

In an embodiment, while cell coverage areas 212 and 216 provide more coverage over cell sites devices 204's former coverage area than the initial cell coverage areas of cell site devices 202 and 206 (see e.g., cell coverage areas 112 and 116 in FIG. 1), some improvement is possible. Accordingly, cell site devices 202 and 206 can incrementally make improvements in real time to the simulated optimal configuration. The improvements to the configuration settings of cell site devices 202 and 206 can result in real world optimal cell coverage areas 222 and 226 which provide better coverage over cell site devices 204's coverage area than coverage areas 212 and 216. By calculating the simulated optimal configuration settings before implementing the configuration settings on the cell site devices 202 and 206, convergence on the optimal solution can be improved over incrementally adjusting configuration settings from the base settings.

Figure 3:
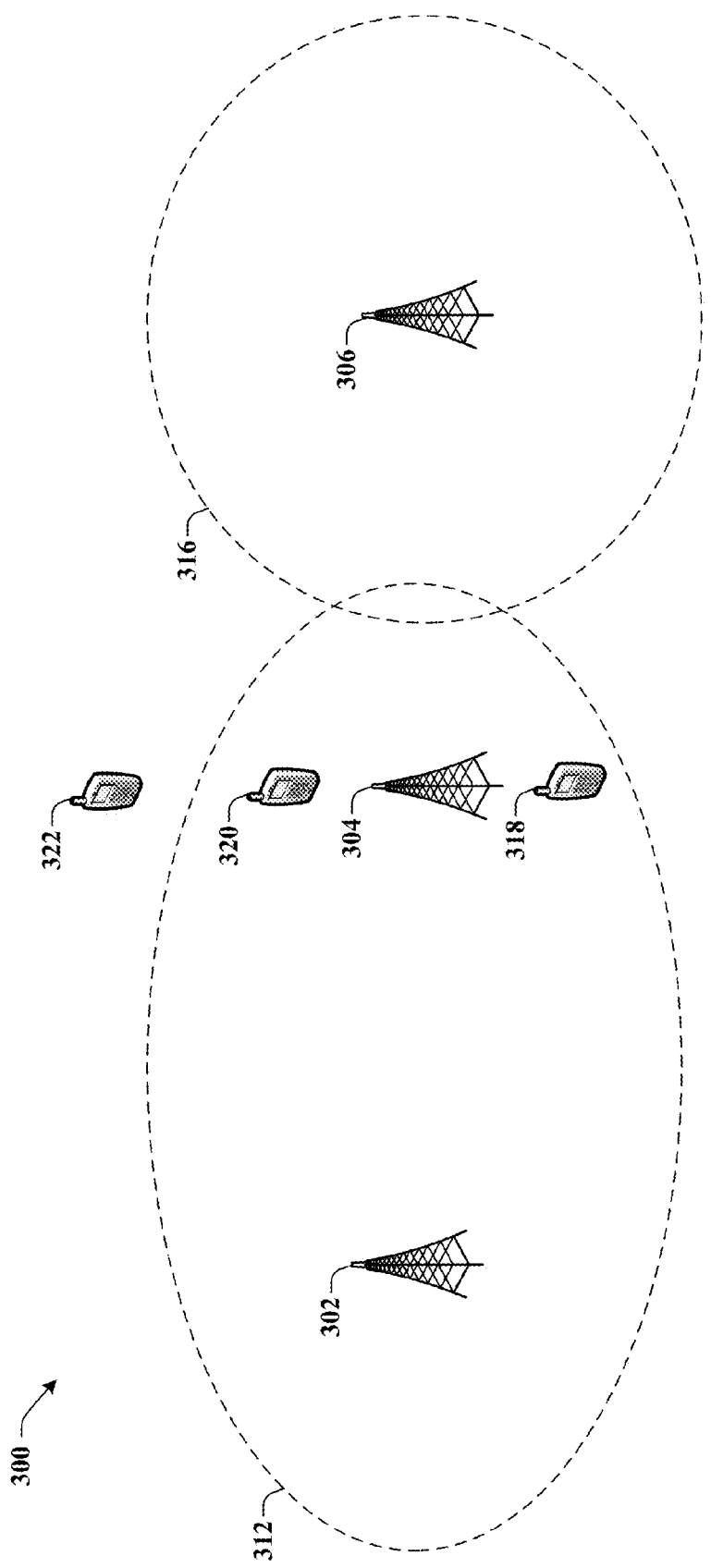
FIG. 3 is an example, non-limiting embodiment of an efficient cell site outage mitigation system in accordance with various aspects described herein.

Turning now to FIG. 3, illustrated is an example, non-limiting embodiment of an efficient cell site outage mitigation system 300 in accordance with various aspects described herein. In an embodiment, the cell site outage mitigation system 300 can take into account user distribution and user demand when simulating optimal configuration settings for cell site devices.

In the embodiment shown in FIG. 3, cell site device 304 can experience an outage or go offline, and cell site devices 302 and 306 can have their configuration settings (antenna tilt, transmission power, etc) adjusted to provide coverage (shown by cell coverage areas 312 and 316 respectively) for the area formerly covered by cell site device 304.

While simulating the offline configuration setting model, system 300 can take into account the current location of mobile devices 318 and 320 within the area as well as user demand. For instance, the system 300 can determine that mobile devices 318 and 320 are closer to cell site device 302 than to cell site device 306, and thus the system 300 can determine that an optimal configuration setting for cell site devices 302 and 306 would be to keep cell coverage area 316 more or less the same, while adjusting the settings of cell site device 302 to extend the cell coverage area 312 to cover mobile devices 318 and 320.

It is to be appreciated that while the embodiment shown in FIG. 3 displays three mobile devices, this is for purposes of simplicity, and that in the real world, a large number of mobile devices are likely. The system 300 can make balancing decisions about whether to adjust configuration settings to cover all possible mobile devices or not. For instance, an area can have a high density of mobile devices, and another area can have a lower density of mobile devices. If the neighboring cell site devices cannot cover all the area experiencing an outage, but must choose which areas to provide coverage for, the system 300 can calculate model configuration settings such that the cell site devices cover the area with the higher number of mobile devices.

The system 300 can also make the determination of model configuration settings based on demand or priority. If mobile devices 320 and 318 are being heavily used, or have current sessions with higher quality of service standards or priority levels than mobile device 322 which is outside of cell coverage areas 312 and 316, the system 300 can calculate model configuration settings to provide cell coverage for the mobile devices 318 and 320 and not for mobile device 322.

In other embodiments, system 300 can make predictive optimal configuration settings, or optimal configuration settings that are different based on a time that an outage occurs. For instance, during sporting events or other public events, a large number of users and mobile devices can be present at the venue for the event. If an outage to cell site device 304 servicing the area in which the venue is located in occurs, the system 300 can determine that it is a higher priority to provide service to the venue than to other areas previously served by cell site device 304. Optimal configuration settings for one or both of cell site devices 302 and 306 can be determined based on providing service to the venue.

In other embodiments, regular patterns of mobile device locations can be identified such as higher density of mobile devices in a specific location due to jobs, commutes, rush-hour traffic, shopping centers, etc. The optimal configuration settings can be calculated to take into consideration these distribution and demand models.

In an embodiment, system 300 can determine the location of mobile devices 318, 320, and 322 based on network location (multilateration) or based on reports received from the mobile devices that are GPS equipped. In other embodiments, system 300 can make predictions about the locations of mobile devices based on known locations of shopping centers, residential areas, office buildings, and etc.

Figure 4:
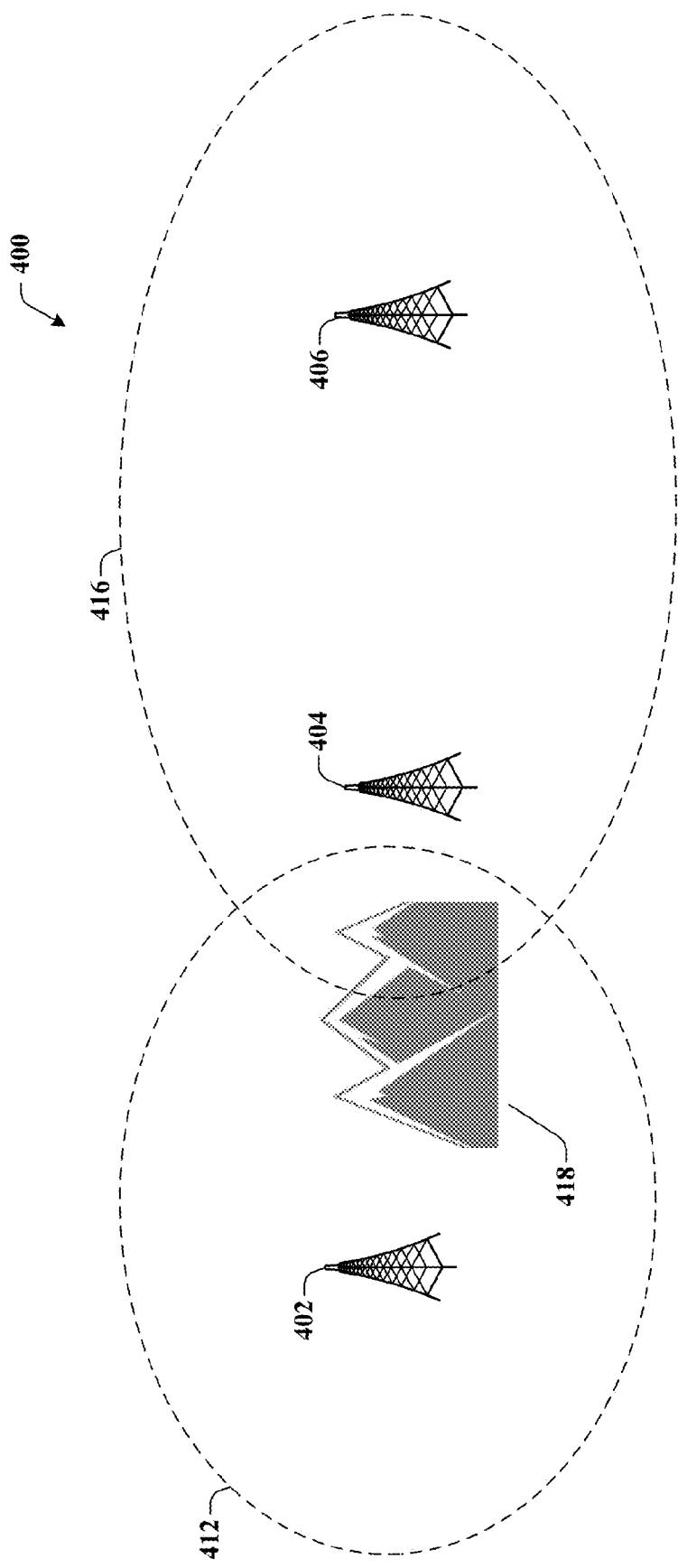
FIG. 4 is an example, non-limiting embodiment of an efficient cell site outage mitigation system in accordance with various aspects described herein.

Turning now to FIG. 4, illustrated is an example, non-limiting embodiment of an efficient cell site outage mitigation system 400 in accordance with various aspects described herein. System 400 can use RF propagation models, terrain and topology, interference, and other factors to determine simulated optimal configuration settings in the same way that system 300 in FIG. 3 uses user distribution and demand models.

In the embodiment shown in FIG. 4, the system 400 can determine model optimal configuration settings for cell site devices 402 and 406 based on a potential outage of cell site 404. The model optimal configuration settings provide for cell coverage areas 412 and 416 that at least in part cover areas normally covered by cell site device 404.

In an embodiment, mountains 418 (or any other hill, or terrain, topological feature, foliage, or building(s) that might interfere with cell coverage areas) stand in between cell site device 402 and cell site device 404. The mountains 418 can interfere with signals broadcast by cell site device 402, and as such, the system 400 can determine that cell site device 402 will not be able to provide coverage for mobile devices in the vicinity of cell site device 404. Accordingly, the model optimal solution has cell site device 406 providing coverage in cell coverage area 416 for mobile devices in the vicinity of cell site device 404. Without this determination performed by system 400, incremental adjustments may never have found optimal configuration settings.

In an embodiment, system 400 can determine the location of cell site devices 402, 404, and 406 using GPS coordinates that are associated with the cell site device station codes or other identifying information. Based on the GPS coordinates, the system can determine if there are topological features, buildings, or other obstructions that may cause interference with cell site device transmissions.

In another embodiment, system 400 can use mobile measurement reports that are received from mobile devices within range of cell site devices 402, 404, and 406. The measurement reports can identify the signal strength of the transmissions received from the cell site devices 402, 404, and 406 at the mobile device. The system 400 can also receive locations of the mobile devices (network location or by onboard GPS coordinates reported to the network) and the cell site devices.

Analyzing the signal strengths of the measurement reports with the locations of the mobile devices and the cell site devices, the system 400 can determine an RF propagation model for the area serviced by cell site devices 402, 404, and 406 and identify areas of path loss, interference and obstruction based on the RF propagation model. Based on the RF propagation model, the system 400 can calculate an optimal configuration setting for cell site devices 402 and 406.

The system 400 can update the simulated optimal configuration settings at periodic, predetermined intervals or as needed in response to detecting a change to a condition affecting the optimal configuration setting. In some embodiments, the system 400 can calculate several simulated optimal configuration settings that are based on different environmental factors. For instance, RF propagation models can be time of day dependent, season dependent (temperatures can affect path loss as well as foliage in summer or lack of foliage in winter), or weather dependent. The system 400 can determine different optimal configuration settings for the different conditions, and depending on when the outage occurs, select a configuration setting based on the RF propagation model that most closely resembles the outage conditions.

Figure 5:
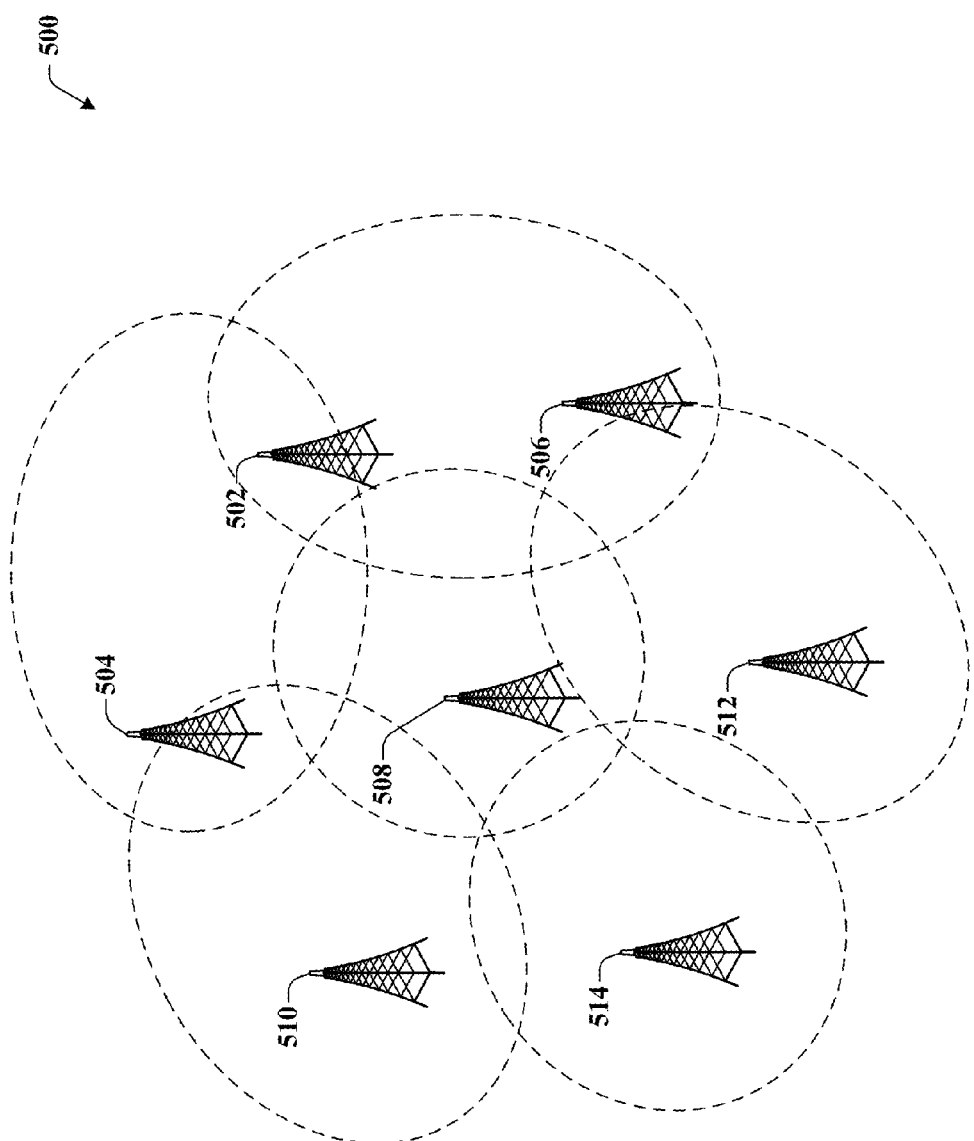
FIG. 5 is an example, non-limiting embodiment of an efficient cell site outage mitigation system in accordance with various aspects described herein.

Turning now to FIG. 5, illustrated is an example, non-limiting embodiment of an efficient cell site outage mitigation system 500 in accordance with various aspects described herein. FIG. 5 depicts an embodiment where system 500 determines model optimal configuration settings for cell site devices that not only neighbor offline cell sites, but for cell site devices that neighbor the neighboring cell site devices.

For example, system 500 determines model configuration settings for cell site devices 504, 506, 508, 510, 512, and 514 in response to a simulated outage at cell site device 502. Cell site devices 504, 506, and 508 can have simulated configuration settings that allow their cell coverage areas to extend to the areas formerly covered by cell site device 502. In return cell site devices 504, 506, and 508 may lose areas which they would have covered during normal operations. In response to that, cell site devices 510, 512, and 514 can be provided with model configuration settings that cover the areas formerly covered by cell site devices 504, 506, and 508. The process can be repeated by as many cell site devices as necessary as to mitigate the loss of coverage caused by an offline cell site device.

Figure 6:
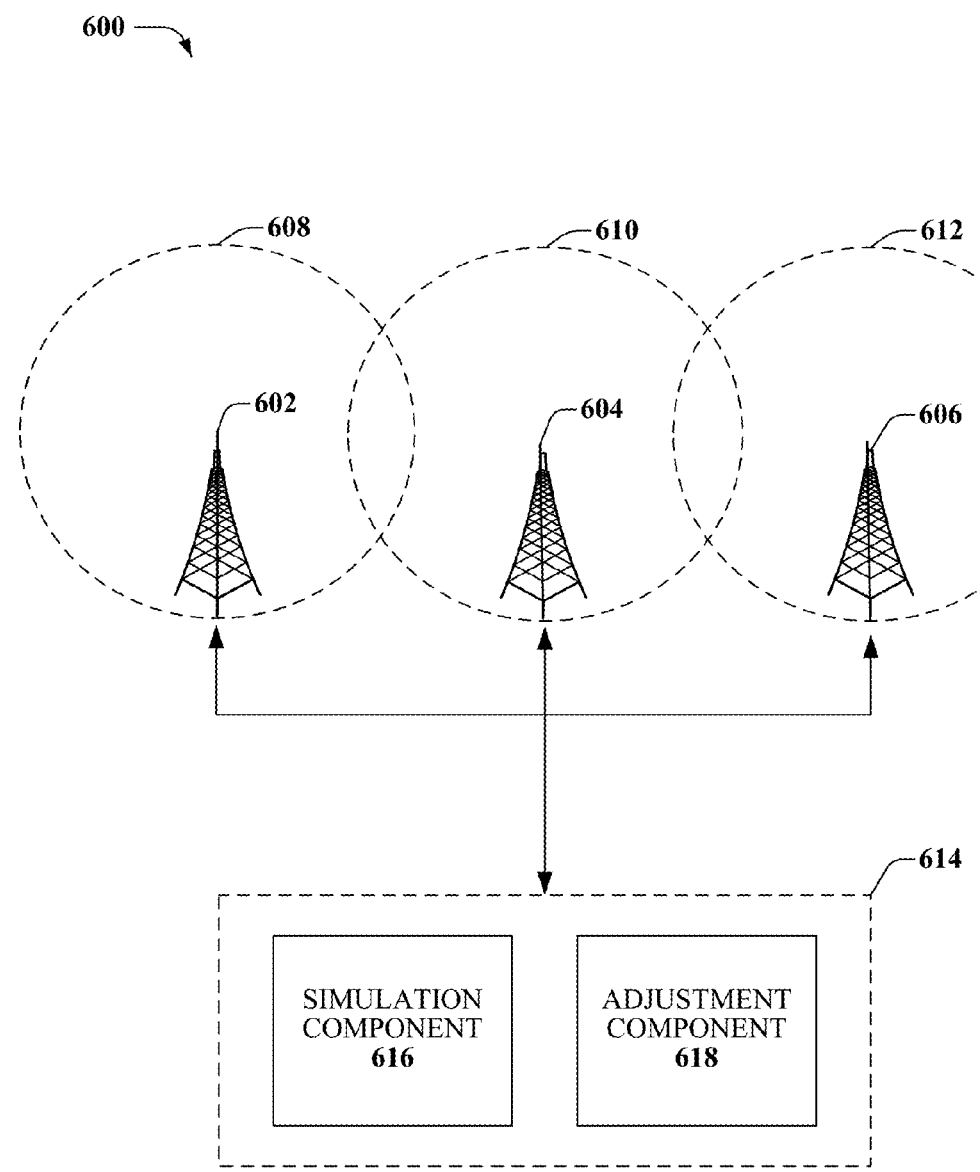
FIG. 6 is a block diagram illustrating an example, non-limiting embodiment of an efficient cell site outage mitigation system in accordance with various aspects described herein.

Turning now to FIG. 6, illustrated is a block diagram of an example, non-limiting embodiment of an efficient cell site outage mitigation system 600 in accordance with various aspects described herein. A mobile network 614 can include simulation component 616 that determines a simulated configuration setting for cell site devices 602, 604, and 606 based on one of the cell site devices being offline.

In an embodiment, the simulation component 616 can determine simulated configuration settings for cell site devices 602 and 606 in case cell site device 604 goes offline. If cell site device 604 were to go offline, mobile devices within cell coverage area 610 would lose connectivity unless the mobile devices were in the areas of cell coverage area 610 that overlap with cell coverage areas 608 and 612. The simulated configuration settings for cell site devices 602 and 606 can adjust the cell coverage areas 608 and 612 to cover as much of the area of former cell coverage area 610 as possible.

In an embodiment, the simulated configuration settings for cell site devices 602 and 606 are stored and not put into use until an outage at cell site device 604 is detected. Simulated configuration settings for each cell site device can be stored that are based on any of cell site devices 602, 604, and 606 going offline. When it is determined that a cell site device has gone offline, adjustment component 618 adjusts the configuration settings using the simulated configuration settings determined by simulation component 616. Adjustment component 618 selects the simulated configuration settings that corresponds to the cell site device outage.

In an embodiment, simulation component 616 can determine simulated configuration settings before an outage is detected. In other embodiments, the simulation component 616 determines the simulated configuration settings at the beginning of an outage. In some embodiments, simulation component 616 can determine a plurality of simulated configuration settings based on certain conditions (weather, time of day, season, temperature, etc). Adjustment component 618 can select the simulated configuration setting by matching the conditions of the simulated configuration setting to the conditions at the time of the outage.

In an embodiment, adjustment component 618 can continue adjusting the configuration setting after implementing the simulated configuration in response to a cell site outage. The simulated configuration setting can be close to optimal, but continued iterative adjustments can improve the coverage beyond the coverage provided by the simulated optimal configuration setting.

Figure 7:
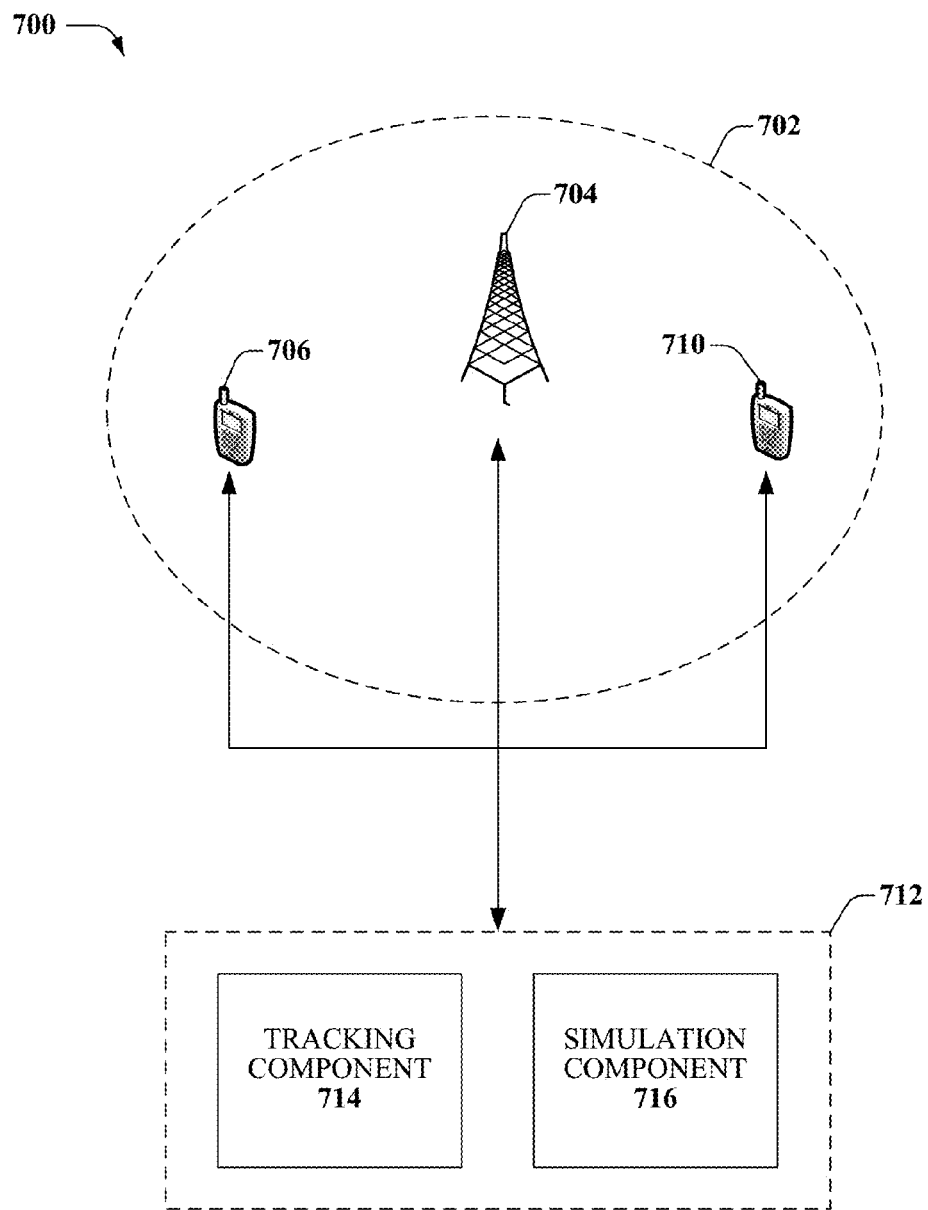
FIG. 7 is a block diagram illustrating an example, non-limiting embodiment of an efficient cell site outage mitigation system in accordance with various aspects described herein.

Turning now to FIG. 7, illustrated is a block diagram of an example, non-limiting embodiment of an efficient cell site outage mitigation system 700 in accordance with various aspects described herein. A mobile network 712 can include simulation component 716 that determines a simulated configuration setting for cell site device 704 based on a neighboring cell site (not shown) being offline.

In an embodiment, simulation component 716 can determine the simulated configuration setting based on RF propagation models, user distribution models, and user demand models determined by tracking component 714. Tracking component 714 can receive mobile measurement reports that are received from mobile devices 706 and 710 that are within cell coverage area 702. The measurement reports can identify the signal strength of the transmissions received from the cell site device 704 at the mobile device 706 or 710. The tracking component 714 can also receive locations of the mobile devices 706 and 710 (network location or by onboard GPS coordinates reported to the network) and the cell site device 704.

Analyzing the signal strengths of the measurement reports with the locations of the mobile devices and the cell site devices, the tracking component 714 can determine an RF propagation model for the area serviced by cell site device 704 and identify areas of path loss, interference and obstruction based on the RF propagation model. Based on the RF propagation model, the simulation component 716 can calculate an optimal configuration setting for cell site device 704 in response to a neighboring cell site device going offline. Tracking component 714 can take into account the current location of mobile devices within the area as well as user demand. For instance, if the cell coverage area 702 has a larger number of mobile devices than a neighboring area, during an outage, the simulation component can give a higher priority to keeping cell coverage area 702 constant.

Figure 8:
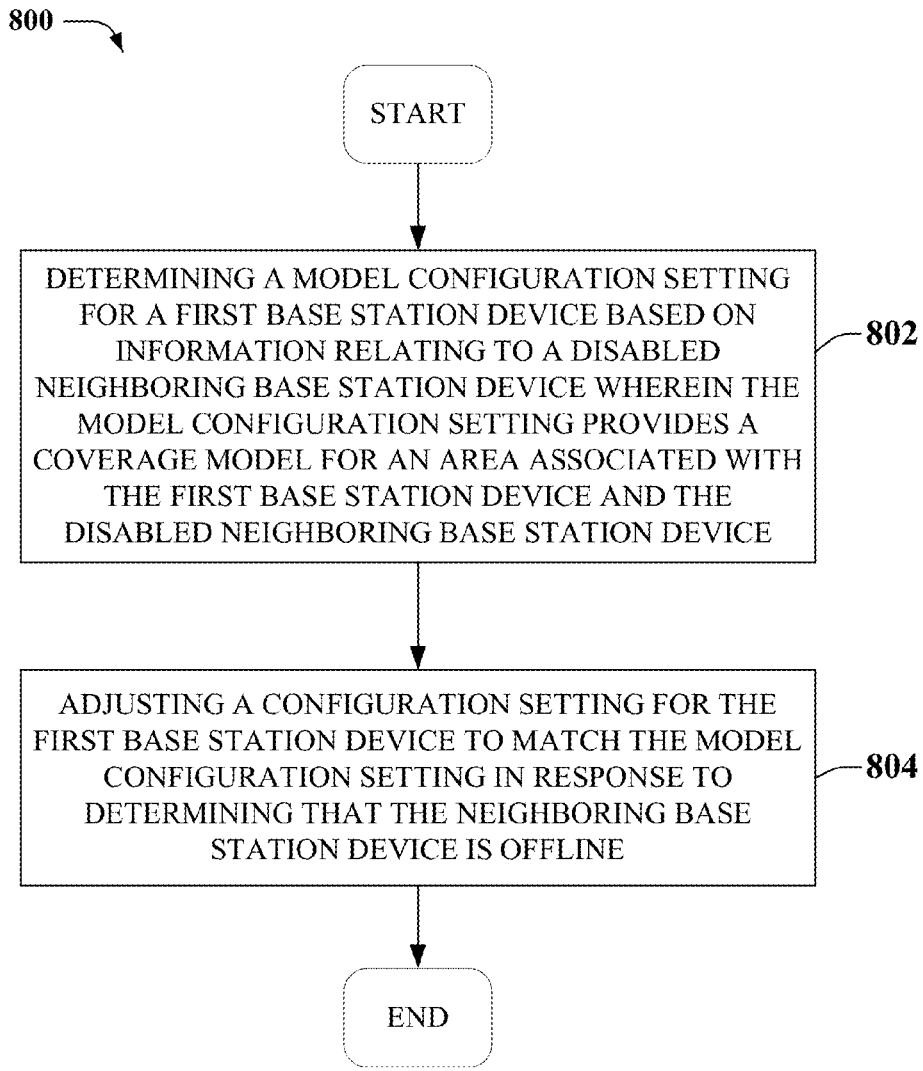
FIG. 8 illustrates a flow diagram of an example, non-limiting embodiment of a method for cell site outage mitigation as described herein.

FIG. 8 illustrates a process in connection with the aforementioned systems. The process in FIG. 8 can be implemented for example by systems 100, 200, 300, 400, 500, 600, and 700 and illustrated in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow diagram of an example, non-limiting embodiment of a method for providing efficient cell site outage mitigation. Methodology 800 can begin at 802, where a model configuration setting for a first base station device is determined, (e.g., by simulation component 616) based on information relating to a disabled neighboring base station device, wherein the model configuration setting provides a coverage model for an area associated with the first base station device and the disabled neighboring base station device.

If a base station device were to go offline, mobile devices within range of the base station device would lose connectivity unless the mobile devices were in range of another base station device. The model configuration setting for the first base station device adjusts the cell coverage area of the first base station device to cover as much of the area formerly covered by the neighboring base station device.

At 804, a configuration setting for the first base station device is adjusted (e.g., by adjustment component 618) to match the model configuration setting in response to determining that the neighboring base station device is offline. Once implemented, iterative corrections to the real-time configuration settings can continue to be made to improve the coverage area of the first base station device.

Figure 9:
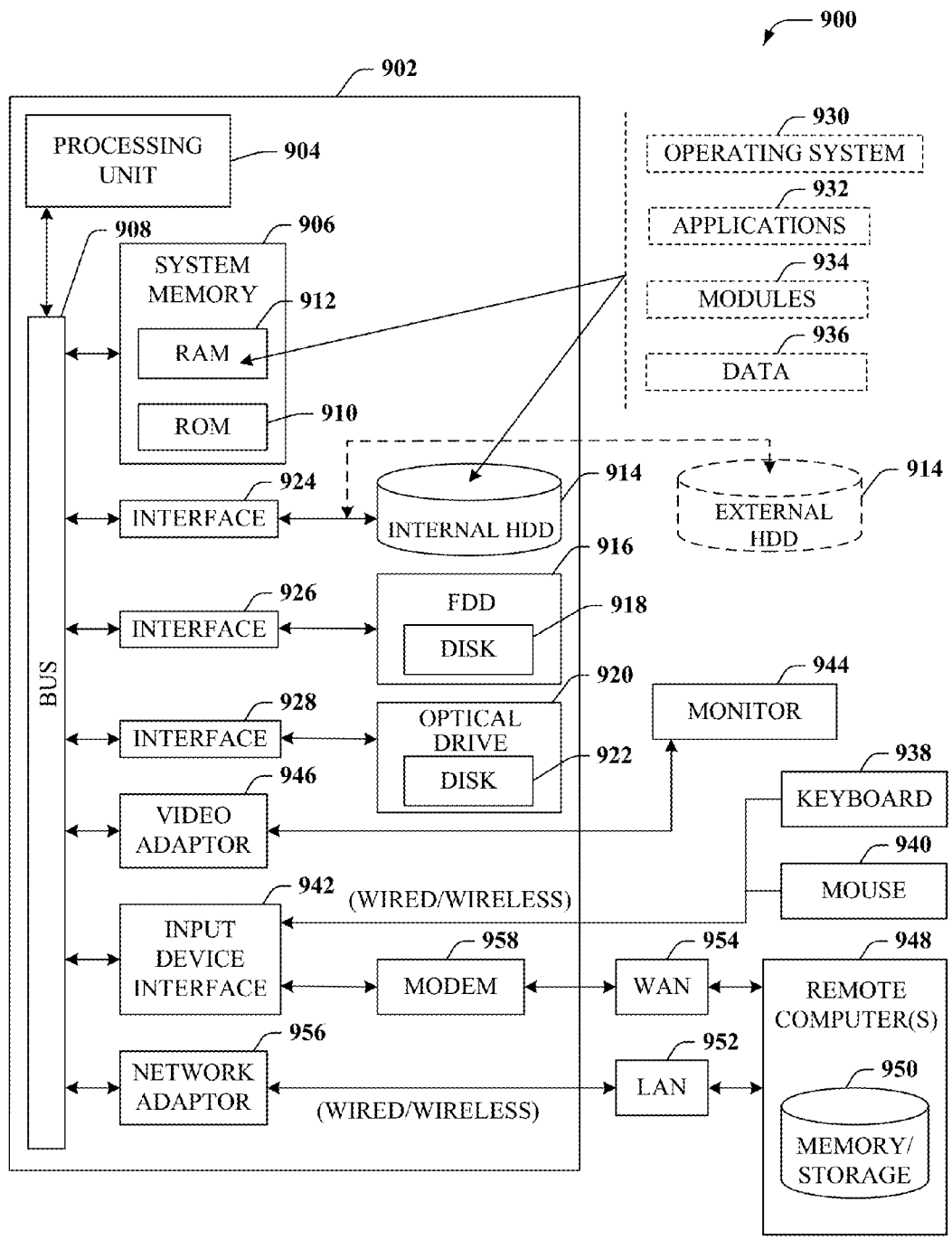
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 10:
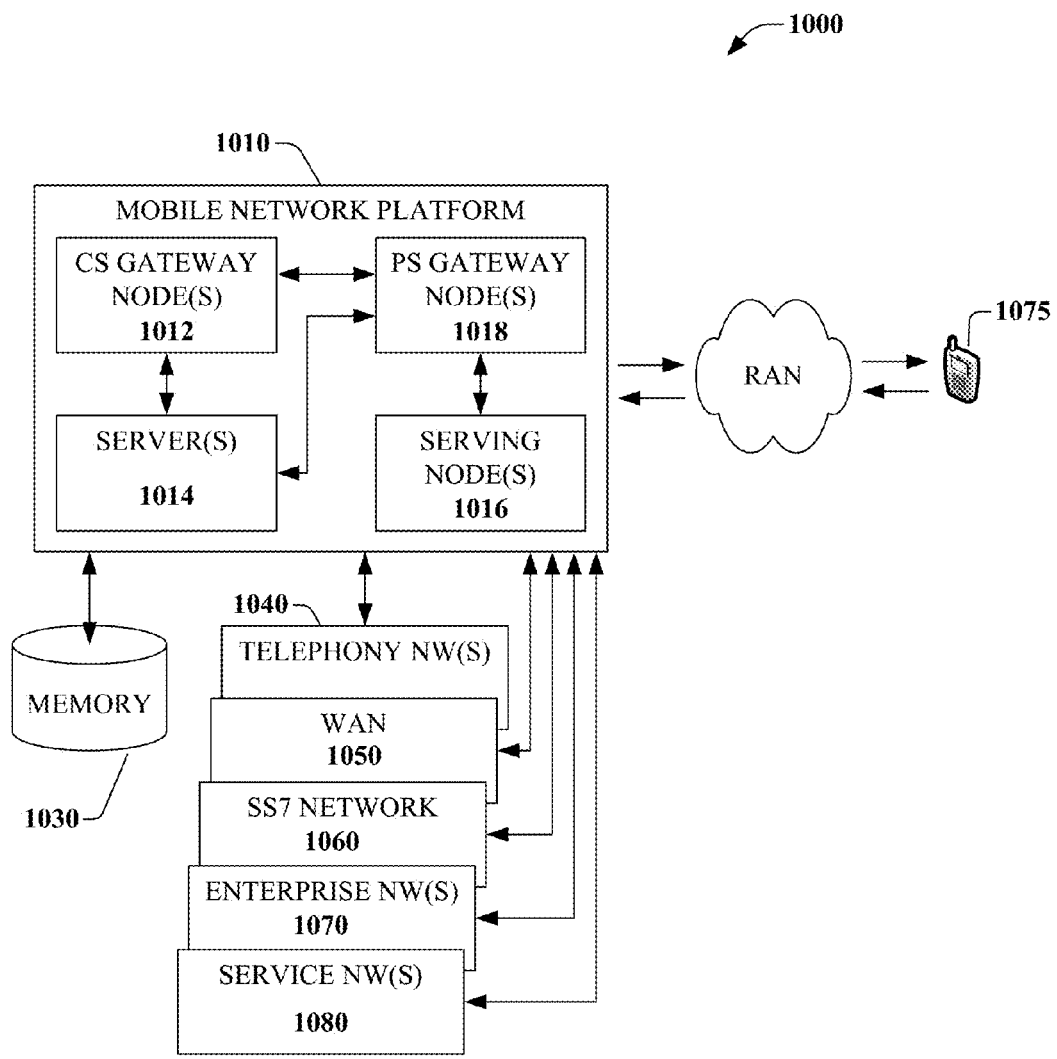
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms;

and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory to store executable instructions; and
   a processor, coupled to the memory, to facilitate execution of the executable instructions to perform operations, comprising:
      determining a first simulated configuration setting for a first cell site device based on a simulated disablement of a second cell site device, wherein the first simulated configuration setting enables a simulated coverage model for an area associated with the first cell site device and the second cell site device, and
      adjusting a configuration setting for the first cell site device to match the first simulated configuration setting in response to determining that the second cell site is disabled; and
      incrementally adjusting the configuration setting according to a function that increases coverage for the area.

2. The system of claim 1, wherein the operations further comprise:
   determining that a change to a condition affecting the simulated coverage model has occurred; and
   updating the first simulated configuration setting based on the change.

3. The system of claim 2, wherein the operations further comprise:
   checking for the change to the condition affecting the simulated coverage model at a set time.

4. The system of claim 1, wherein the operations further comprise:
   determining the first simulated configuration setting before a planned outage.

5. The system of claim 1, wherein the first simulated configuration setting is based on a location of a mobile device in the area associated with the first cell site device and the second cell site device.

6. The system of claim 1, wherein the first simulated configuration setting is based on a network usage of a mobile device in the area associated with the first cell site device and the second cell site device.

7. The system of claim 1, wherein the first simulated configuration setting is based on an environmental factor, a terrain factor, and a distribution of cell site devices.

8. The system of claim 7, wherein the first simulated configuration setting is further based on a measurement report received from a mobile device.

9. The system of claim 1, wherein the operations further comprise:
   determining a second simulation configuration setting for a third cell site device that neighbors the first cell site device based on the first simulated configuration setting and the simulated coverage model for the area.

10. The system of claim 1, wherein the configuration setting comprises a transmission power setting and atilt angle setting for an antenna associated with the first cell site device.

11. A method, comprising:
    determining, by a device comprising a processor, a model configuration setting for a first base station device based on information relating to a disabled neighboring base station device, wherein the model configuration setting provides a coverage model for an area associated with the first base station device and the disabled neighboring base station device; and
    adjusting a configuration setting for the first base station device to match the model configuration setting in response to determining that the neighboring base station device is offline.

12. The method of claim 11, further comprising:
    incrementally adjusting the configuration setting to increase coverage for the area.

13. The method of claim 11, wherein the adjusting the configuration setting comprises adjusting an antenna power level and an antenna tilt angle of an antenna associated with the first base station device.

14. The method of claim 11, further comprising:
    updating the model configuration setting in response to detecting a change in a condition affecting the coverage model.

15. The method of claim 11, wherein the determining the model configuration setting is performed before the neighboring base station device is determined to have gone offline.

16. The method of claim 11, wherein the determining the model configuration setting is based on data representing an RF propagation model, a user demand model and a user distribution model.

17. The method of claim 16, wherein the determining the RF propagation model is based on data representing an environmental factor, a terrain factor, and a base station device distribution model.

18. A computer-readable storage device storing executable instructions that, in response to execution, cause a system comprising a processor to perform operations, comprising:
    modeling a simulated configuration setting for a first base station device based on an offline second base station device that neighbors the first base station device, wherein the simulated configuration setting enables a coverage model for an area associated with the first base station device and the offline second base station device;
    adjusting a configuration setting for the first base station device to match the simulated configuration setting in response to determining that the second base station device is offline; and
    incrementally adjusting the configuration setting to improve coverage for the area.

19. The computer-readable storage device of claim 18, wherein the operations further comprise:
    modeling another simulated coverage setting for another base station device that neighbors the first base station device and is in another area distinct from the area, wherein the other simulated coverage setting is based on the simulated configuration setting and the coverage model for the area.

20. The computer-readable storage device of claim 18, wherein the operations further comprise:
    updating the simulated configuration setting in response to detecting a change in a condition affecting the coverage model.

* * * * *